(12) United States Patent
Holmes et al.

(10) Patent No.: US 11,383,593 B2
(45) Date of Patent: Jul. 12, 2022

(54) ELECTRIC DRIVE UNIT CLUTCH

(71) Applicant: GM Global Technology Operations LLC, Detroit, MI (US)

(72) Inventors: Alan G. Holmes, Clarkston, MI (US); Pete R. Garcia, North Branch, MI (US); Joseph R. Littlefield, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 110 days.

(21) Appl. No.: 17/085,038

(22) Filed: Oct. 30, 2020

(65) Prior Publication Data

US 2022/0136594 A1    May 5, 2022

(51) Int. Cl.
| | |
|---|---|
| *B60K 6/387* | (2007.10) |
| *B60K 17/02* | (2006.01) |
| *B60K 17/35* | (2006.01) |
| *F16D 47/04* | (2006.01) |
| *B60K 6/383* | (2007.10) |
| *B60K 6/48* | (2007.10) |
| *B60K 1/00* | (2006.01) |

(52) U.S. Cl.
CPC .............. *B60K 6/387* (2013.01); *B60K 6/383* (2013.01); *B60K 17/02* (2013.01); *B60K 17/3515* (2013.01); *F16D 47/04* (2013.01); *B60K 6/48* (2013.01); *B60K 2001/001* (2013.01)

(58) Field of Classification Search
CPC .......... B60K 6/387; B60K 6/383; B60K 6/48; B60K 2001/001; F16D 47/04; F16D 41/12–16; F16D 11/00–16
See application file for complete search history.

(56) References Cited

U.S. PATENT DOCUMENTS

| | | | | |
|---|---|---|---|---|
| 1,784,722 | A * | 12/1930 | Carickhoff | F16D 41/04 74/343 |
| 1,799,987 | A * | 4/1931 | Rauen | F16D 41/04 74/343 |
| 1,862,188 | A * | 6/1932 | Legge | F16D 23/10 74/576 |
| 6,520,885 | B2 * | 2/2003 | Gassmann | F16H 48/16 192/54.5 |
| 11,180,133 | B2 * | 11/2021 | Campbell | B60W 20/40 |
| 2001/0032768 | A1 * | 10/2001 | Gassmann | B60K 23/08 192/48.92 |
| 2002/0019284 | A1 * | 2/2002 | Aikawa | B60K 17/04 903/952 |
| 2014/0094341 | A1 * | 4/2014 | Ruder | B60K 6/48 477/5 |
| 2021/0245729 | A1 * | 8/2021 | Campbell | B60W 10/06 |

\* cited by examiner

*Primary Examiner* — David R Morris
(74) *Attorney, Agent, or Firm* — Vivacqua Crane, PLLC

(57) ABSTRACT

An electric drive unit clutch for an automobile includes a first rotatable shaft, a one-way clutch fixedly mounted onto the first rotatable shaft, a dog clutch slidingly mounted onto the first rotatable shaft and adapted to rotate with the first rotatable shaft, a clutch ring positioned between the one-way clutch and the dog clutch, and a second rotatable shaft rotatable engaged with the clutch ring, wherein the clutch ring is adapted to transfer rotational motion from the second rotatable shaft through the one-way clutch and the dog clutch to the first rotatable shaft.

12 Claims, 3 Drawing Sheets

ELECTRIC DRIVE UNIT CLUTCH

INTRODUCTION

The present disclosure relates to an electrified powertrain and to an electric drive unit clutch adapted to transfer torque from a secondary power source in an electrified vehicle.

In electrified vehicles, often clutches, specifically, one way clutches are used to transfer torque from a secondary power source, generally and electric motor, to a drive shaft or drive axle of the vehicle for both propulsion and braking in both forward and reverse vehicle directions. One-way clutches are generally larger and heavier than dog clutches having equal carrying capacity. Dog clutches are more difficult to incorporate because in order to engage and dis-engage the dog clutch, the opposing teeth within the dog clutch need to be engaged with high power actuators or, held in a clearance position by alignment features.

Thus, while current electrified powertrains achieve their intended purpose, there is a need for an electrified powertrain that incorporates a dog clutch to provide higher load carrying capacity, as well as a one-way clutch to allow the dog clutch to be actuated without using high power actuators or alignment features.

SUMMARY

According to several aspects of the present disclosure, and electric drive unit clutch for an automobile includes a first rotatable shaft, a one-way clutch fixedly mounted onto the first rotatable shaft, a dog clutch slidingly mounted onto the first rotatable shaft and adapted to rotate with the first rotatable shaft, a clutch ring positioned between the one-way clutch and the dog clutch; and a second rotatable shaft rotatably engaged with the clutch ring, wherein the clutch ring is adapted to transfer rotational motion from the second rotatable shaft through the one-way clutch and the dog clutch to the first rotatable shaft.

According to another aspect, the clutch ring has a first side having features adapted to engage the one-way clutch such that when the clutch ring is driven by the second rotatable shaft, the clutch ring engages the one-way clutch and transfers torque to the first rotatable shaft, and when the clutch ring is not driven by the second rotatable shaft, the first rotatable shaft and the one-way clutch rotate freely relative to the clutch ring.

According to another aspect, the clutch ring has a second side having features adapted to engage the dog clutch and the dog clutch is selectively moveable axially along the rotatable shaft between a first position, wherein the dog clutch and the clutch ring are not engaged and a second position, wherein the dog clutch and the clutch ring are engaged and the dog clutch and the clutch ring are rotationally locked together.

According to another aspect, the second side of the clutch ring includes a plurality of rotating teeth and the dog clutch includes a corresponding plurality of sliding teeth, further wherein, when the one-way clutch and the clutch ring are engaged and torque is being transferred to the one-way clutch from the clutch ring, the rotating teeth of the clutch ring and the sliding teeth of the dog clutch are held in a clearance position, whereby the dog clutch may be freely moved axially between the first and second positions.

According to another aspect, the first side of the clutch ring includes a plurality of engagement teeth spaced from one another and the one-way clutch includes a plurality of pivoting locking struts having a distal end adapted to engage the engagement teeth, each locking strut including a spring adapted to bias the distal end of the locking strut outward from the one-way clutch toward the clutch ring.

According to another aspect, the one-way clutch is a selectable one-way clutch.

According to another aspect, the one-way clutch includes plates adapted to selectively move from a first position, wherein the locking struts are biased outward by the springs, and a second position, wherein the plates prevent the locking struts from being biased outward.

According to another aspect, the electric drive unit clutch further includes an electromagnetic actuator adapted to selectively move the dog clutch between the first and second positions.

According to several aspects of the present disclosure, an electrified powertrain for an automobile includes a first electric drive unit for providing torque to a first axle of the automobile, the first electric drive unit including an first electric motor, a first gear set, an electric drive unit clutch, and a second gear set, wherein, torque is transferred from the electric motor to the electric drive unit clutch through the second gear set and from the electric drive unit clutch to a differential of the first axle through the first gear set, the electric drive unit clutch further including a first rotatable shaft rotatably engaged with the first gearset, a one-way clutch fixedly mounted onto the first rotatable shaft, a dog clutch slidingly mounted onto the first rotatable shaft and adapted to rotate with the first rotatable shaft, a clutch ring positioned between the one-way clutch and the dog clutch, and a second rotatable shaft rotatably engaged with both of the clutch ring and the second gearset, wherein the clutch ring is adapted to transfer rotational motion from the electric motor, through the second gearset to the second rotatable shaft and through the one-way clutch and the dog clutch to the first rotatable shaft.

According to another aspect, the first electric drive unit further includes an internal combustion engine, a third gear set, and a second electric drive unit clutch, including, a first rotatable shaft rotatably engaged with the internal combustion engine, a one-way clutch fixedly mounted onto the first rotatable shaft, a dog clutch slidingly mounted onto the first rotatable shaft and adapted to rotate with the first rotatable shaft, a clutch ring positioned between the one-way clutch and the dog clutch, and a second rotatable shaft rotatably engaged with both of the clutch ring and the third gearset, wherein the clutch ring is adapted to transfer rotational motion from the internal combustion engine, through the one-way clutch and the dog clutch to the second rotatable shaft and through the third gearset to the differential of the first axle.

According to another aspect, the electrified powertrain further includes a second electric drive unit for providing torque to a second axle of the automobile, the second electric drive unit including an second electric motor, a fourth gear set, a third electric drive unit clutch, and a fifth gear set, wherein, torque is transferred from the second electric motor to the third electric drive unit clutch through the fifth gear set and from the third electric drive unit clutch to a differential of the second axle through the fourth gear set, the third electric drive unit clutch further including a first rotatable shaft rotatably engaged with the first gearset, a one-way clutch fixedly mounted onto the first rotatable shaft, a dog clutch slidingly mounted onto the first rotatable shaft and adapted to rotate with the first rotatable shaft, a clutch ring positioned between the one-way clutch and the dog clutch, and a second rotatable shaft rotatably engaged with both of the clutch ring and the fifth gearset, wherein the clutch ring is adapted to transfer rotational motion from the second electric motor, through the fifth gearset to the second rotatable shaft and through the one-way clutch and the dog clutch to the first rotatable shaft.

According to another aspect, for each of the first, second and third electric drive unit clutches, the clutch ring has a first side having features adapted to engage the one-way clutch such that when the clutch ring is driven by the second rotatable shaft, the clutch ring engages the one-way clutch and transfers torque to the first rotatable shaft, and when the clutch ring is not driven by the second rotatable shaft, the first rotatable shaft and the one-way clutch rotate freely relative to the clutch ring.

According to another aspect, for each of the first, second and third electric drive unit clutches, the clutch ring has a second side having features adapted to engage the dog clutch and the dog clutch is selectively moveable axially along the rotatable shaft between a first position, wherein the dog clutch and the clutch ring are not engaged and a second position, wherein the dog clutch and the clutch ring are engaged and the dog clutch and the clutch ring are rotationally locked together.

According to another aspect, for each of the first, second and third electric drive unit clutches, the second side of the clutch ring includes a plurality of rotating teeth and the dog clutch includes a corresponding plurality of sliding teeth, further wherein, when the one-way clutch and the clutch ring are engaged and torque is being transferred to the one-way clutch from the clutch ring, the rotating teeth of the clutch ring and the sliding teeth of the dog clutch are held in a clearance position, whereby the dog clutch may be freely moved axially between the first and second positions.

According to another aspect, for each of the first, second and third electric drive unit clutches, the first side of the clutch ring includes a plurality of engagement teeth spaced from one another and the one-way clutch includes a plurality of pivoting locking struts having a distal end adapted to engage the engagement teeth, each locking strut including a spring adapted to bias the distal end of the locking strut outward from the one-way clutch toward the clutch ring.

According to another aspect, for at least one of the first, second and third electric drive unit clutches, the one-way clutch is a selectable one-way clutch.

According to another aspect, for the at least one of the first, second and third electric drive unit clutches, the one-way clutch includes plates adapted to selectively move from a first position, wherein the locking struts are biased outward by the springs, and a second position, wherein the plates prevent the locking struts from being biased outward.

According to another aspect, the at least one of the first, second and third electric drive unit clutches further includes an electromagnetic actuator adapted to selectively move the dog clutch between the first and second positions.

According to several aspects of the present disclosure, an electric drive unit clutch for an automobile includes a first rotatable shaft, a one-way clutch fixedly mounted onto the first rotatable shaft, a dog clutch slidingly mounted onto the first rotatable shaft and adapted to rotate with the first rotatable shaft, a clutch ring having a first side and a second side positioned between the one-way clutch and the dog clutch, a second rotatable shaft rotatably engaged with the clutch ring, wherein the clutch ring is adapted to transfer rotational motion from the second rotatable shaft through the one-way clutch and the dog clutch to the first rotatable shaft, and an electromagnetic actuator, the first side of the clutch ring includes a plurality of engagement teeth spaced from one another and the one-way clutch including a plurality of pivoting locking struts having a distal end adapted to engage the engagement teeth, each locking strut including a spring adapted to bias the distal end of the locking strut outward from the one-way clutch toward the clutch ring, such that when the clutch ring is driven by the second rotatable shaft, the clutch ring engages the one-way clutch and transfers torque to the first rotatable shaft, and when the clutch ring is not driven by the second rotatable shaft, the first rotatable shaft and the one-way clutch rotate freely relative to the clutch ring, the second side of the clutch ring including a plurality of rotating teeth and the dog clutch including a corresponding plurality of sliding teeth, wherein, when the one-way clutch and the clutch ring are engaged and torque is being transferred to the one-way clutch from the clutch ring, the rotating teeth of the clutch ring and the sliding teeth of the dog clutch are held in a clearance position, whereby the dog clutch is selectively moveable axially along the shaft between a first position, wherein the dog clutch and the clutch ring are not engaged and a second position, wherein the dog clutch and the clutch ring are engaged and the dog clutch and the clutch ring are rotationally locked together, and the electromagnetic actuator adapted to selectively move the dog clutch between the first and second positions.

According to another aspect, the one-way clutch is a selectable one-way clutch having plates adapted to selectively move from a first position, wherein the locking struts are biased outward by the springs, and a second position, wherein the plates prevent the locking struts from being biased outward.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
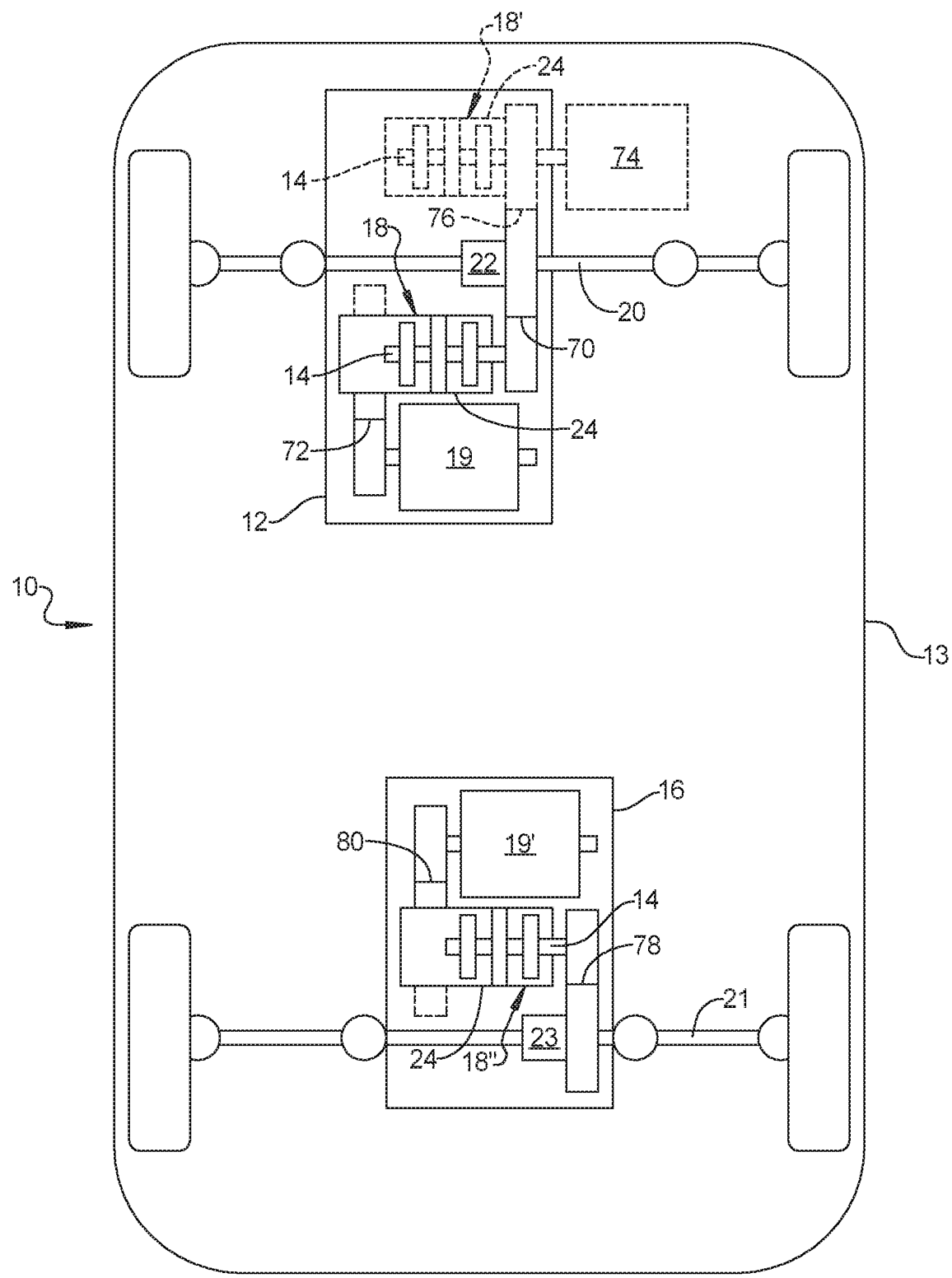
FIG. 1 is a schematic view of an electrified powertrain according to an exemplary embodiment of the present disclosure.

Referring to FIG. 1, in an exemplary embodiment of the present disclosure, an electrified powertrain 10 for an automobile 13 includes a first electric drive unit 12 for providing torque to a first axle 20 of the automobile 13 and a second electric drive unit 16 for providing torque to a second axle 21 of the automobile 13.

The first electric drive unit 12 includes a first electric motor 19, a first gearset 70, a first electric drive unit clutch 18 and a second gear set 72. Torque is transferred from the first electric motor 19 to the first electric drive unit clutch 18 through the second gear set 72 and from the first electric drive unit clutch 18 to a differential 22 of the first axle 20 through the first gear set 70.

In an exemplary embodiment, the first electric drive unit 12 further includes an internal combustion engine 74, a third gear set 76 and a second electric drive unit clutch 18'. Torque is transferred from the internal combustion engine 74 to the second electric drive unit clutch 18' and from the second electric drive unit clutch 18' to the differential 22 of the first axle 20 through the third gear set 76.

The second electric drive unit 16 includes a second electric motor 19', a fourth gear set 78, a third electric drive unit clutch 18" and a fifth gear set 80. Torque is transferred from the second electric motor 19' to the third electric drive unit clutch 18" through the fifth gear set 80 and from the third electric drive unit clutch 18" to a differential 23 of the second axle 21 through the fourth gear set 78. Using the first and third electric drive unit clutches 18, 18", the automobile 13 may be selectively driven by one of the first or second electric drive units 12, 16, or both of the first and second electric drive units 12, 16. If only one of the electric drive units 12, 16 is selected for use, the electric motor 19, 19' of the un-selected electric drive unit 12, 16 is off and stationary so that it neither consumes electrical power or causes drag. Electrified powertrains can vary greatly and it should be understood by those skilled in the art that the novel features of the present disclosure may be applied to Electrified powertrains other than the exemplary embodiment shown in FIG. 1 without departing from the scope of the present disclosure.

Figure 2:
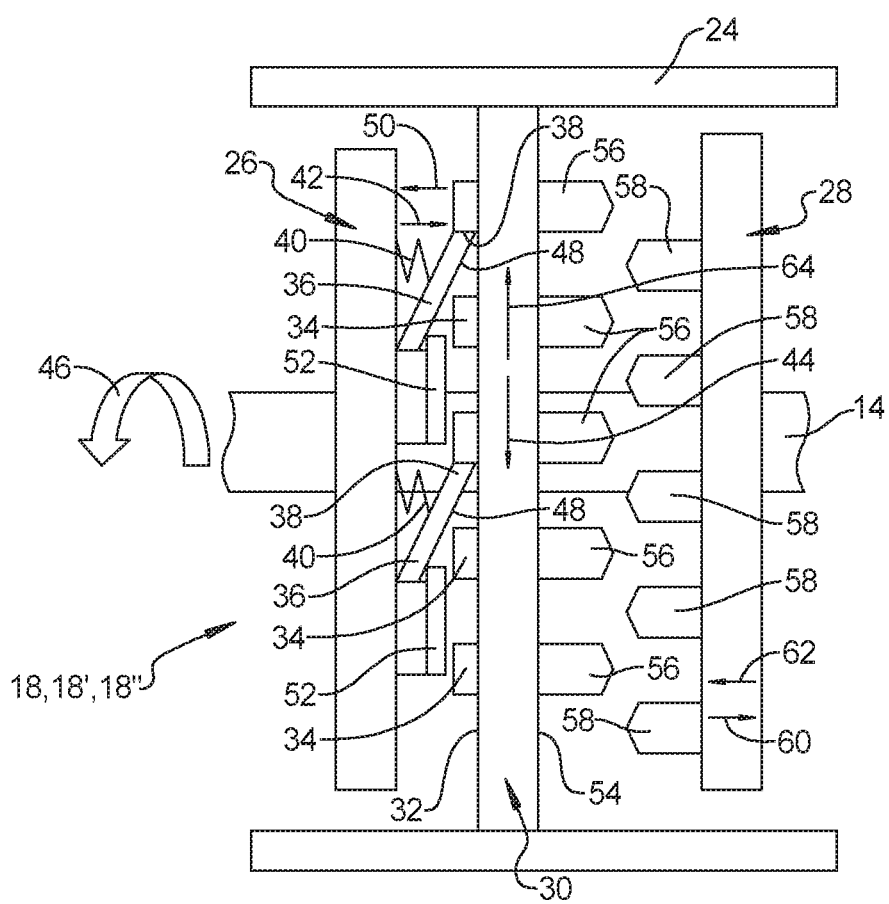
FIG. 2 is a perspective view of an electric drive unit clutch according to an exemplary embodiment of the present disclosure.

Referring to FIG. 2, each of the first, second and third electric drive unit clutches 18, 18', 18" includes a first rotatable shaft 14, a one-way clutch 26 fixedly mounted onto the first rotatable shaft 14, a dog clutch 28 slidingly mounted onto the first rotatable shaft 14 and adapted to rotate with the first rotatable shaft 14, a clutch ring 30 positioned between the one-way clutch 26 and the dog clutch 28, and a second rotatable shaft 24 engaged with the clutch ring 30, wherein the clutch ring 30 is adapted to transfer rotational motion from the second rotatable shaft 24 through the one-way clutch 26 and the dog clutch 28 to the first rotatable shaft 14. The second rotatable shaft 24 is a hollow tube structure that encloses the electric drive unit clutch 18, 18', 18". The clutch ring 30 may be a separable component of the electric drive unit 12, 16 specific to the clutching function, as shown, or may be integral to another rotatable part (not shown), such as, a gear, hub, or housing that may contain internal components or have additional functions.

Referring again to FIG. 1, the first rotatable shaft 14 of the first electric drive unit clutch 18 is rotatably engaged with the first gear set 70, and thereby to the differential 22 of the first axle 20 for driving or braking the automobile 13. The first gear set 70 provides output from the first electric drive unit clutch 18. The second rotatable shaft 24 of the first electric drive unit clutch 18 is rotatably engaged with both the clutch ring 30 and the second gear set 72, and thereby the first electric motor 19, to receive torque for driving and braking the automobile 13. The second gear set 72 provides input to the first electric drive unit clutch 18. Torque from the first electric motor 19 is transferred to the second rotatable shaft 24 of the first electric drive unit 12 through the second gear set 72. The clutch ring 30 transfers torque from the second rotatable shaft 24 to the first rotatable shaft 14 through the one-way clutch 26 and the dog clutch 28. The first rotatable shaft 14 transfers torque to the differential 22 of the first axle 20 through the first gear set 70 to drive or brake the automobile 13.

Where the first electric drive unit 12 includes an internal combustion engine 74, the first rotatable shaft 14 of the second electric drive unit clutch 18' is rotatably engaged with the internal combustion engine 74. The second rotatable shaft 24 of the second electric drive unit clutch 18' is rotatably engaged with both the clutch ring 30 and the third gear set 76. Torque from the internal combustion engine 74 is transferred through the first rotatable shaft 14 to the one-way clutch 26 and the dog clutch 28, and through the one-way clutch 26 and the dog clutch 28 to the clutch ring 30 of the second electric drive unit clutch 18'. The clutch ring 30 transfers torque to the differential 22 of the first axle 20 through the third gear set 76.

The first rotatable shaft 14 of the third electric drive unit clutch 18" is rotatably engaged with the fourth gear set 78, and thereby to the differential 23 of the second axle 21 for driving or braking the automobile 13. The fourth gear set 78 provides output from the third electric drive unit clutch 18". The second rotatable shaft 24 of the third electric drive unit clutch 18" is rotatably engaged with both the clutch ring 30 and the fifth gear set 80, and thereby the second electric motor 19', to receive torque for driving and braking the automobile 13. The fifth gear set 80 provides input to the third electric drive unit clutch 18". Torque from the second electric motor 19' is transferred to the second rotatable shaft 24 of the third electric drive unit clutch 18" through the fifth gear set 80. The clutch ring 30 transfers torque from the second rotatable shaft 24 to the first rotatable shaft 14 through the one-way clutch 26 and the dog clutch 28. The first rotatable shaft 14 transfers torque to the differential 23 of the second axle 21 through the fourth gear set 78 to drive or brake the automobile 13. The clutch ring 30 has a first side 32 having features adapted to engage the one-way clutch 26. When the clutch ring 30 is driven by the second rotatable shaft 24, the clutch ring 30 engages the one-way clutch 26 and transfers torque to the first rotatable shaft 14. When the clutch ring 30 is not being driven by the second rotatable shaft 24, the first rotatable shaft 14 and the one-way clutch 26 rotate freely relative to the clutch ring 30.

The following describes the details of the first, second and third electric drive unit clutches 18, 18', 18". It should be understood that the structure of the first, second, and third electric drive unit clutches 18, 18', 18" are substantially identical. The following description applies to each of the first, second and third electric drive unit clutches 18, 18', 18". Referring to FIG. 2, for each of the first, second and third electric drive unit clutches 18, 18', 18", in an exemplary embodiment, the first side 32 of the clutch ring 30 includes a plurality of engagement teeth 34 spaced from one another. The one-way clutch 26 includes a plurality of pivoting locking struts 36. Each of the plurality of locking struts 36 includes a distal end 38 that is adapted to engage one of the plurality of engagement teeth 34 of the clutch ring 30. Each locking strut 36 includes a spring 40 adapted to bias the distal end 38 of the locking strut 36 outward from the one-way clutch 26 toward the clutch ring 30, as indicated by arrow 42.

The distal end 38 of each of the plurality of locking struts 36 engages one of the plurality of engagement teeth 34 to provide a positive stop that prevents rotation of the clutch ring 30 relative to the one-way clutch 26 when torque is supplied to the clutch ring 30 from the second rotatable shaft 24. When the second rotatable shaft 24 rotates the clutch ring 30 in a first direction, as indicated by arrow 44, the engagement of the plurality of locking struts 36 with the plurality of engagement teeth 34 transfers rotation from the clutch ring 30 to the one-way clutch 26 and to the first rotating shaft 14, as indicated by arrow 46.

When torque is supplied to the first rotatable shaft 14, as indicated by arrow 46, the first rotatable shaft 14 will rotate, as indicated by arrow 44, independently of the clutch ring 30. When the first rotatable shaft 14 rotates freely of the clutch ring 30, each of the plurality of engagement teeth 34 of the clutch ring 30 contact a lateral surface 48 of one of the plurality of locking struts 36 and pushes the locking strut 36 against the biasing force of the spring 40, and pushing the locking strut 36 away from the clutch ring 30, as indicated by arrow 50, and allowing the one-way clutch 26 and the first rotatable shaft 14 to rotate freely of the clutch ring 30.

Figure 3:
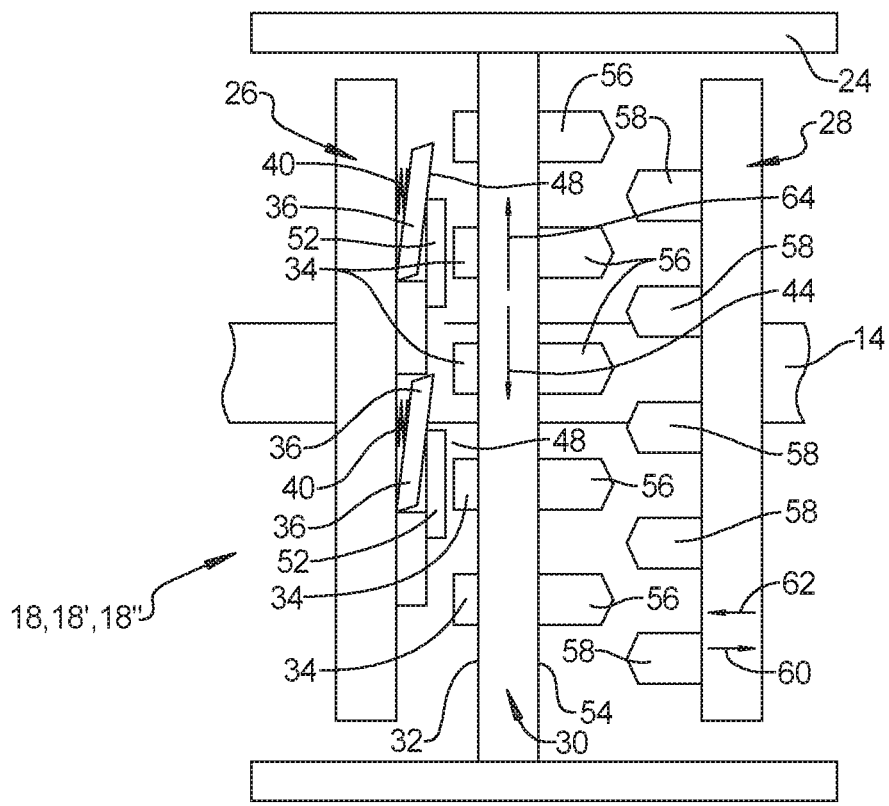
FIG. 3 is a perspective view of an electric drive unit clutch according to an exemplary embodiment of the present disclosure, wherein a selectable one-way clutch is actuated to an open position.

In another exemplary embodiment, the one-way clutch 26 is a selectable one-way clutch. Referring to FIG. 2 and FIG. 3, the one-way clutch 26 includes a plurality of plates 52, one plate 52 is associated with each of the plurality of locking struts 36. Each of the plurality of plates 52 are adapted to selectively move from a first position, wherein the locking struts 36 are biased outward by the springs 40, as shown in FIG. 2, and a second position, wherein the plates 52 prevent the locking struts 36 from being biased outward, as shown in FIG. 3. The plates 52 allow the locking struts 36 to be selectively held from engagement with the clutch ring 30 so the clutch ring 30 and the one-way clutch 26 are free to rotate relative to one another in either direction.

Figure 4:
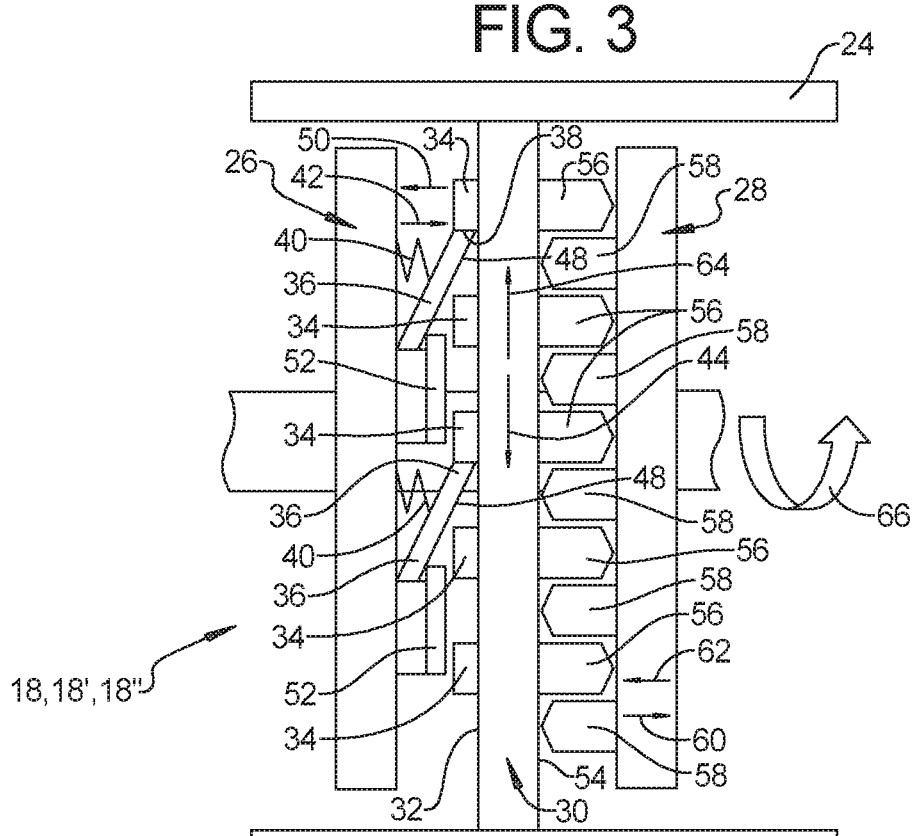
FIG. 4 is a perspective view of an electric drive unit clutch according to an exemplary embodiment, wherein a dog clutch if the electric drive unit clutch is engaged.

The clutch ring 30 has a second side 54 having features adapted to engage the dog clutch 28. Referring FIG. 2 and FIG. 4, the second side 54 of the clutch ring 30 includes a plurality of rotating teeth 56 and the dog clutch includes a corresponding plurality of sliding teeth 58. The dog clutch 28 is selectively moveable axially along the first rotatable shaft 14 between a first position, wherein the plurality of sliding teeth 58 of the dog clutch 28 and the plurality of rotating teeth 56 of the clutch ring 30 are not engaged, as shown in FIG. 2, and a second position, wherein the plurality of sliding teeth 58 of the dog clutch 28 and the plurality of rotating teeth 56 of the clutch ring 30 are engaged, as shown in FIG. 4, and the dog clutch 28 and the clutch ring 30 are rotationally locked together.

When the clutch ring 30 and the one-way clutch 26 are engaged, and torque is being transferred to the one-way clutch 26 from the clutch ring 30, the rotating teeth 56 of the clutch ring 30 and the sliding teeth 58 of the dog clutch 28 are held in a clearance position. This is true for all instances where the plurality of locking struts 36 of the one-way clutch 26 are engaged with the plurality of engagement teeth 34 of the clutch ring 30, and allows the dog clutch 28 to be freely moved axially between the first and second positions, as indicated by arrows 60, 62. This provides an advantage over traditional uses of a dog clutch which require higher power actuation or alignment features to place the dog clutch in a clearance position for engagement and dis-engagement.

In an exemplary embodiment, the dog clutch 28 is moved back and forth between the first and second positions by an electromagnetic actuator. It should be understood that the dog clutch 28 may be moved back and forth between the first and second positions by any suitable means without departing from the scope of the present disclosure. The electric drive unit clutch 18 allows the second rotatable shaft 24 to selectively or automatically be dis-connected from the first rotatable shaft 14

In operation, the electrified powertrain 10 can operate with an electric drive unit clutch 18, 18', 18" completely dis-connected, whereby the dog clutch 28 is dis-engaged and the one-way clutch 26 is freewheeling. When an electric drive unit clutch 18, 18', 18" is connected, the corresponding one-way clutch 26 is engaged. This happens when the second rotatable shaft 24 attempts to rotate the clutch ring 30 faster than the first rotatable shaft 14, causing the locking struts 36 of the one-way clutch 26 to engage the engagement teeth 34 of the clutch ring 30, whereby rotational torque is transferred from the second rotatable shaft 24 through the clutch ring 30 to the one-way clutch 26 and the first rotatable shaft 14. Once the one-way clutch 26 is engaged, the plurality of sliding teeth 58 of the dog clutch 28 and the plurality of rotating teeth 56 of the clutch ring 30 are aligned in a clearance position, as shown in FIG. 2, and the dog clutch 28 can be applied by moving the dog clutch 28 from the first position to the second position, as indicated by arrow 60 in FIG. 4.

In some circumstances there is a torque hand-off from the one-way clutch 26 to the dog clutch 28. When the one-way clutch 26 is carrying torque, the dog clutch 28 remains in a clearance position, wherein, even if the dog clutch 28 is moved to the second position, and the plurality of sliding teeth 58 of the dog clutch 28 and the plurality of rotating teeth 56 of the clutch ring 30 are engaged, as shown in FIG. 4, there is no torque transfer between the clutch ring 30 and the dog clutch 28.

If the second rotatable shaft 24 is operated in reverse, the clutch ring 30 will rotate in an opposite direction, as indicated by arrow 64 in FIG. 2. The one-way clutch 26 will not engage the clutch ring 30 when the clutch ring 30 rotates in this direction relative to the one-way clutch 26, therefore, the one-way clutch 26 will free-wheel and reverse torque will be transferred from the second rotatable shaft 24 to the first rotatable shaft 14 through the dog clutch 28, as indicated by arrow 66.

To disconnect the second rotatable shaft 24 from the first rotatable shaft 14 when torque is being transferred to the first rotatable shaft 14 through the electric drive unit clutch 18, the second rotatable shaft 24 is sped up sufficiently to make sure the one-way clutch 26 is engaged, torque is being carried by the one-way clutch 26 and the plurality of sliding teeth 58 of the dog clutch 28 and the plurality of rotating teeth 56 of the clutch ring 30 are aligned in a clearance position, as shown in FIG. 4. At this point, the dog clutch 28 may be dis-engaged by moving the dog clutch 28 from the second position to the first position, as indicated by arrow 64. Once the dog clutch 28 is dis-engaged, the second rotatable shaft 24 stops applying forward torque to the one-way clutch 26, the one-way clutch 26 free-wheels relative to the clutch ring 30 and the first rotatable shaft 14 is no longer driven by the second rotatable shaft 24.

The electric drive unit clutch 18, 18', 18" is adapted for use of the one-way clutch 26 to provide torque for driving the automobile 13 in its forward direction. The dog clutch 28 provides braking torque for the forward direction and driving torque in the reverse direction. The electric drive unit clutch 18, 18', 18" may be engaged by first controlling the motor 19, 19', 74 for forward toque that will cause the motor 19, 19', 74 to spin until the one-way clutch 26 is engaged. With the one-way clutch 26 engaged, the dog clutch 28 is positioned for engagement and can then be engaged, completing the engagement of the electric drive unit clutch 18, 18', 18".

An exemplary embodiment of the first electric drive unit 12 includes an electric drive unit clutch 18' having a first rotatable shaft 14 connected to the engine 74 for receiving torque for driving and braking the automobile 13 and a second rotatable shaft 24 connected to the third gear set 76 and thereby to the differential 22 for driving and braking the automobile 13. The second electric drive unit clutch 18' is adapted for use of the one-way clutch 26 to provide torque for driving the automobile 13 in the forward direction. The second electric drive unit clutch 18' may be engaged by rotating the engine 74 forward until the one-way clutch 26 is engaged. With the one-way clutch 26 engaged, the dog clutch 28 is positioned for engagement and can then be engaged, completing the engagement of the second electric drive unit clutch 18'.

An electrified powertrain 10 and electric drive unit clutch 18 of the present disclosure offers several advantages. The dog clutch 28 provides more load carrying capability that the one-way clutch 26, allowing an electrified vehicle incorporating an electrified powertrain 10 to be more durable. The use of the one-way clutch 26 in combination with the dog clutch 28, wherein for all instances where the one-way clutch 26 is engaged the dog clutch 28 is held in a clearance position and is freely engaged or dis-engaged, allows the use of lower power actuators to engage and dis-engage the dog clutch 28 and does not require additional alignment features to enable engagement and dis-engagement of the dog clutch 28. Finally, the electric drive unit clutch 18 of the present disclosure allows an electrified vehicle to be selectively or automatically switched between operating with either one or both of primary and secondary power sources.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An electrified powertrain for an automobile comprising:
    a first electric drive unit for providing torque to a first axle of the automobile, the first electric drive unit including:
        a first electric motor;
        a first gear set;
        a first electric drive unit clutch; and
        a second gear set, wherein, torque is transferred from the first electric motor to the first electric drive unit clutch through the second gear set and from the first electric drive unit clutch to a differential of the first axle through the first gear set, the first electric drive unit clutch further including:
            a first rotatable shaft rotatably engaged with the first gear set;
            a one-way clutch fixedly mounted onto the first rotatable shaft;
            a dog clutch slidingly mounted onto the first rotatable shaft and adapted to rotate with the first rotatable shaft;
            a clutch ring positioned between the one-way clutch and the dog clutch; and
            a second rotatable shaft rotatably engaged with both of the clutch ring and the second gearset, wherein the clutch ring is adapted to transfer rotational motion from the electric motor, through the second gearset to the second rotatable shaft and through the one-way clutch and the dog clutch to the first rotatable shaft.

2. The electrified powertrain of claim 1, wherein the first electric drive unit further includes:
    an internal combustion engine;
    a third gear set; and
    a second electric drive unit clutch, including:
        a first rotatable shaft rotatably engaged with the internal combustion engine;
        a one-way clutch fixedly mounted onto the first rotatable shaft;
        a dog clutch slidingly mounted onto the first rotatable shaft and adapted to rotate with the first rotatable shaft;
        a clutch ring positioned between the one-way clutch and the dog clutch; and
        a second rotatable shaft rotatably engaged with both of the clutch ring and the third gearset, wherein the clutch ring is adapted to transfer rotational motion from the internal combustion engine, through the one-way clutch and the dog clutch to the second rotatable shaft and through the third gearset to the differential of the first axle.

3. The electrified powertrain of claim 1, further including:
    a second electric drive unit for providing torque to a second axle of the automobile, the second electric drive unit including:
        a second electric motor;
        a fourth gear set;
        a third electric drive unit clutch; and
        a fifth gear set, wherein, torque is transferred from the second electric motor to the third electric drive unit clutch through the fifth gear set and from the third electric drive unit clutch to a differential of the second axle through the fourth gear set, the third electric drive unit clutch further including:
            a first rotatable shaft rotatably engaged with the first gearset;
            a one-way clutch fixedly mounted onto the first rotatable shaft;
            a dog clutch slidingly mounted onto the first rotatable shaft and adapted to rotate with the first rotatable shaft;
            a clutch ring positioned between the one-way clutch and the dog clutch; and
            a second rotatable shaft rotatably engaged with both of the clutch ring and the fifth gearset, wherein the clutch ring is adapted to transfer rotational motion from the second electric motor, through the fifth gearset to the second rotatable shaft and through the one-way clutch and the dog clutch to the first rotatable shaft.

4. The electrified powertrain of claim 3, wherein, for each of the first and third electric drive unit clutches, the clutch ring has a first side having features adapted to engage the one-way clutch such that when the clutch ring is driven by the second rotatable shaft, the clutch ring engages the one-way clutch and transfers torque to the first rotatable shaft, and when the clutch ring is not driven by the second rotatable shaft, the rotatable shaft and the one-way clutch rotate freely relative to the clutch ring.

5. The electrified powertrain of claim 4, wherein, for each of the first and third electric drive unit clutches, the clutch ring has a second side having features adapted to engage the dog clutch and the dog clutch is selectively moveable axially along the rotatable shaft between a first position, wherein the dog clutch and the clutch ring are not engaged and a second position, wherein the dog clutch and the clutch ring are engaged and the dog clutch and the clutch ring are rotationally locked together.

6. The electrified powertrain of claim 5, wherein, for each of the first and third electric drive unit clutches, the features on the second side of the clutch ring include a plurality of rotating teeth and the dog clutch includes a corresponding plurality of sliding teeth, further wherein, when the one-way clutch and the clutch ring are engaged and torque is being transferred to the one-way clutch from the clutch ring, the rotating teeth of the clutch ring and the sliding teeth of the dog clutch are held in a clearance position, whereby the dog clutch may be freely moved axially between the first and second positions.

7. The electrified powertrain of claim 6, wherein, for each of the first and third electric drive unit clutches, the features on the first side of the clutch ring include a plurality of engagement teeth spaced from one another and the one-way clutch includes a plurality of pivoting locking struts having a distal end adapted to engage the engagement teeth, each locking strut including a spring adapted to bias the distal end of the locking strut outward from the one-way clutch toward the clutch ring.

8. The electrified powertrain of claim 7, wherein, for at least one of the first and third electric drive unit clutches, the one-way clutch is a selectable one-way clutch.

9. The electrified powertrain of claim 8, wherein, for the at least one of the first and third electric drive unit clutches, the one-way clutch includes plates adapted to selectively move from a first position, wherein the locking struts are biased outward by the springs, and a second position, wherein the plates prevent the locking struts from being biased outward.

10. The electrified powertrain of claim 6, wherein, the at least one of the first and third electric drive unit clutches further includes an electromagnetic actuator adapted to selectively move the dog clutch between the first and second positions.

11. An electric drive unit clutch for an automobile comprising:
   a first rotatable shaft;
   a one-way clutch fixedly mounted onto the first rotatable shaft;
   a dog clutch slidingly mounted onto the first rotatable shaft and adapted to rotate with the first rotatable shaft;
   a clutch ring having a first side and a second side positioned between the one-way clutch and the dog clutch;
   a second rotatable shaft rotatably engaged with the clutch ring, wherein the clutch ring is adapted to transfer rotational motion from the second rotatable shaft through the one-way clutch and the dog clutch to the first rotatable shaft; and
   an electromagnetic actuator;
   the first side of the clutch ring includes a plurality of engagement teeth spaced from one another and the one-way clutch including a plurality of pivoting locking struts having a distal end adapted to engage the engagement teeth, each locking strut including a spring adapted to bias the distal end of the locking strut outward from the one-way clutch toward the clutch ring, such that when the clutch ring is driven by the second rotatable shaft, the clutch ring engages the one-way clutch and transfers torque to the first rotatable shaft, and when the clutch ring is not driven by the second rotatable shaft, the first rotatable shaft and the one-way clutch rotate freely relative to the clutch ring;
   the second side of the clutch ring including a plurality of rotating teeth and the dog clutch including a corresponding plurality of sliding teeth, wherein, when the one-way clutch and the clutch ring are engaged and torque is being transferred to the one-way clutch from the clutch ring, the rotating teeth of the clutch ring and the sliding teeth of the dog clutch are held in a clearance position, whereby the dog clutch is selectively moveable axially along the shaft between a first position, wherein the dog clutch and the clutch ring are not engaged and a second position, wherein the dog clutch and the clutch ring are engaged and the dog clutch and the clutch ring are rotationally locked together; and
   the electromagnetic actuator adapted to selectively move the dog clutch between the first and second positions.

12. The electric drive unit clutch of claim 11, wherein the one-way clutch is a selectable one-way clutch having plates adapted to selectively move from a first position, wherein the locking struts are biased outward by the springs, and a second position, wherein the plates prevent the locking struts from being biased outward.

\* \* \* \* \*